United States Patent
Aoki et al.

(10) Patent No.: US 8,958,033 B2
(45) Date of Patent: Feb. 17, 2015

(54) INFORMATION PROCESSING APPARATUS

(75) Inventors: Kengou Aoki, Nagano (JP); Nobuhiro Honda, Nagano (JP); Kiyohito Fujita, Kanagawa (JP); Nobuyuki Shigeno, Nagano (JP); Shuichi Tatemori, Nagano (JP)

(73) Assignee: Sony Corporation (JP)

( * ) Notice: Subject to any disclaimer, the term of this patent is extended or adjusted under 35 U.S.C. 154(b) by 153 days.

(21) Appl. No.: 13/611,782

(22) Filed: Sep. 12, 2012

(65) Prior Publication Data

US 2013/0077017 A1 Mar. 28, 2013

(30) Foreign Application Priority Data

Sep. 28, 2011 (JP) ................. 2011-211862

(51) Int. Cl.
*G02F 1/1335* (2006.01)
*G02F 1/1333* (2006.01)

(52) U.S. Cl.
CPC .... *G02F 1/133308* (2013.01); *G02F 1/133528* (2013.01); *G02F 2001/13332* (2013.01); *G02F 2001/133325* (2013.01); *G02F 2001/133331* (2013.01)
USPC .................. 349/96; 349/58; 349/59; 349/60

(58) Field of Classification Search
CPC .............. G02F 1/133308; G02F 1/133528
USPC .............................. 349/58–60, 96
See application file for complete search history.

(56) References Cited

U.S. PATENT DOCUMENTS

| 7,956,813 | B2 | 6/2011 | Arima et al. |
| 8,228,246 | B2 | 7/2012 | Arima et al. |
| 2007/0065091 | A1 | 3/2007 | Hinata et al. |
| 2009/0011197 | A1 | 1/2009 | Matsuhira |
| 2009/0033826 | A1 | 2/2009 | Shimizu |
| 2010/0053499 | A1* | 3/2010 | Sasaki ............ 349/62 |

FOREIGN PATENT DOCUMENTS

| JP | 2008-288801 A | 11/2008 |
| KR | 20080073910 A | 8/2008 |

OTHER PUBLICATIONS

Partial European Search Report from EP Application No. 12185531, dated Feb. 4, 2013.

* cited by examiner

*Primary Examiner* — Phu Vu
(74) *Attorney, Agent, or Firm* — Lerner, David, Littenberg, Krumholz & Mentlik, LLP (57) ABSTRACT

Provided is an information processing apparatus including a rectangular display panel, a polarizing plate covering an entire surface of the display panel, and a frame supporting the display panel, wherein the polarizing plate includes a polarizing plate extended portion extended from at least one side surface of the polarizing plate outward beyond the display panel, and the frame includes a frame extended portion extended from the frame along an extending direction of the polarizing plate extended portion to support the polarizing plate extended portion.

14 Claims, 12 Drawing Sheets

FIG. 10

INFORMATION PROCESSING APPARATUS

CROSS-REFERENCE TO RELATED APPLICATION

The present application claims priority from Japanese Patent Application No. JP 2011-211862 filed in the Japanese Patent Office on Sep. 28, 2011, the entire content of which is incorporated herein by reference.

BACKGROUND

The present disclosure relates to an information processing apparatus, and more particularly to an information processing apparatus having a display panel and a polarizing plate.

An information processing apparatus includes an electronic device such as a notebook computer and a PDA (Personal Digital Assistant). This kind of electronic device has a display panel and a polarizing plate for displaying information such as an image and a character.

SUMMARY

Recently, a flush surface structure (structure having an even and smooth surface) like a single plate has been requested for a surface structure of a display part of the electronic device. On the other hand, a member (e.g., protection plate) capable of being used is limited for achieving the flush surface structure and selecting such member causes a problem of deterioration (e.g., lower visibility or lower luminance) in a display function.

An embodiment of the present disclosure provides a technique for achieving the optimum flush surface structure without deterioration in the display function.

According to an embodiment of the present disclosure, there is provided an information processing apparatus which includes a rectangular display panel, a polarizing plate covering an entire surface of the display panel, and a frame supporting the display panel, wherein the polarizing plate includes a polarizing plate extended portion extended from at least one side surface of the polarizing plate outward beyond the display panel, and the frame includes a frame extended portion extended from the frame along an extending direction of the polarizing plate extended portion to support the polarizing plate extended portion.

According to an embodiment of the present disclosure, an utmost surface of the information processing apparatus can be formed of a single plate by an opposite substrate side polarizing plate and the polarizing plate extended portion. Further, the frame extended portion supports the polarizing plate extended portion thereby enabling the polarizing plate extended portion to be inhibited from deformation and the like. Still further, though the opposite substrate side polarizing plate is extended, the display function is not deteriorated. Accordingly, the optimum flush surface structure can be achieved without deterioration in the display function.

According to the embodiments of the present disclosure as described above, the optimum flush surface structure can be achieved without deterioration in the display function.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The preferred embodiment will be described in the following order.

1. Information Processing Apparatus Outline
2. Display Side Housing Configuration according to Comparison Examples
3. Display Side Housing Configuration according to Present Embodiment
   3-1. Liquid Crystal Display Module Configuration
   3-2. Liquid Crystal Display Module Manufacturing Processes
   3-3. Housing & Surround Configurations
4. Conclusion <1. Information Processing Apparatus Outline>

In the present embodiment, an electronic device such as a notebook computer having a display part is described as an example of an information processing apparatus.

Figure 1:
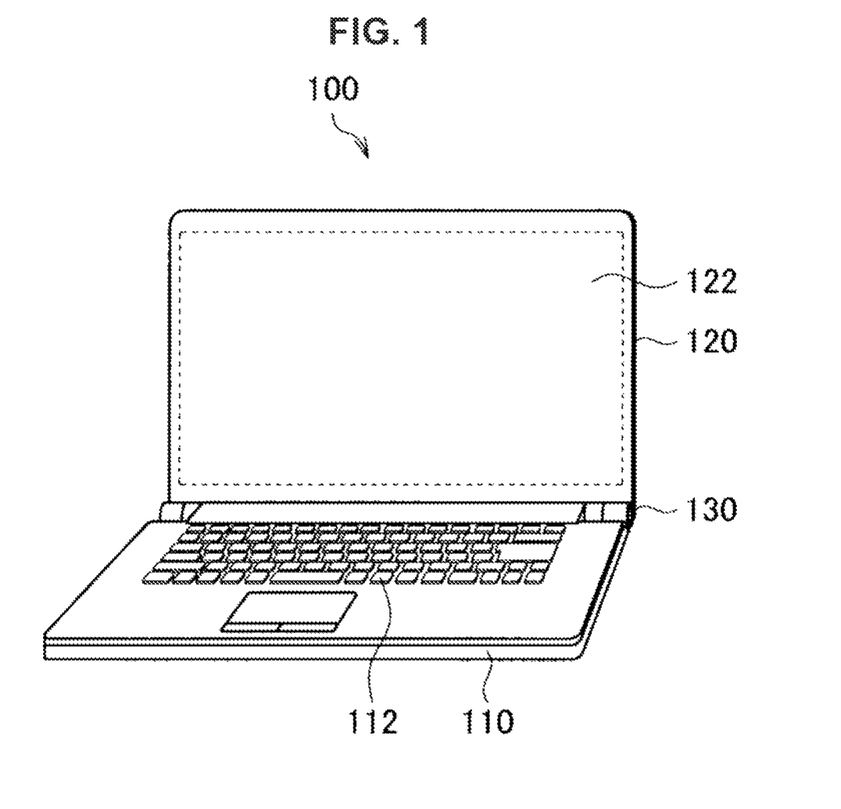
FIG. 1 is a perspective view illustrating an electronic device.

An appearance configuration of an electronic device 100 will be described with reference to FIG. 1. FIG. 1 is a perspective view illustrating the electronic device 100. Note that, the electronic device is not limited to the notebook computer but may include a mobile telephone, a PDA, a game machine, an electronic dictionary, a tablet computer and the like.

As illustrated in FIG. 1, the electronic device 100 includes a body side housing 110, a display side housing 120 and a hinge part 130. The body side housing 110 and the display side housing 120 are formed of flat plates, respectively, each having the same size as the other.

The body side housing 110 has an input part 112 accepting a user operation. The input part 112 detects the user operation and outputs an electric signal corresponding to the user operation. The input part 112 includes a keyboard, a pointing device and the like as illustrated in FIG. 1. Note that, the input part 112 is not limited to these, but may include a touch panel, for example.

The display side housing 120 has a display part 122 displaying a various kinds of information. The display part 122 includes, for example, a display device such as a liquid crystal display. Note that, a detailed configuration of the display side housing 120 will be described below.

The hinge part 130 foldably couples the body side housing 110 and the display side housing 120. The display side housing 120 turns between an open position illustrated in FIG. 1 and a closed position covering an upper surface of the body side housing 110.

<2. Display Side Housing Configuration according to Comparison Examples>

A configuration of a display side housing according to two comparison examples (first comparison example and second comparison example) will be described with reference to FIG. 2A, FIG. 2B, FIG. 3A and FIG. 3B before describing a configuration of the display side housing 120 according to the present embodiment.

Figure 2A:
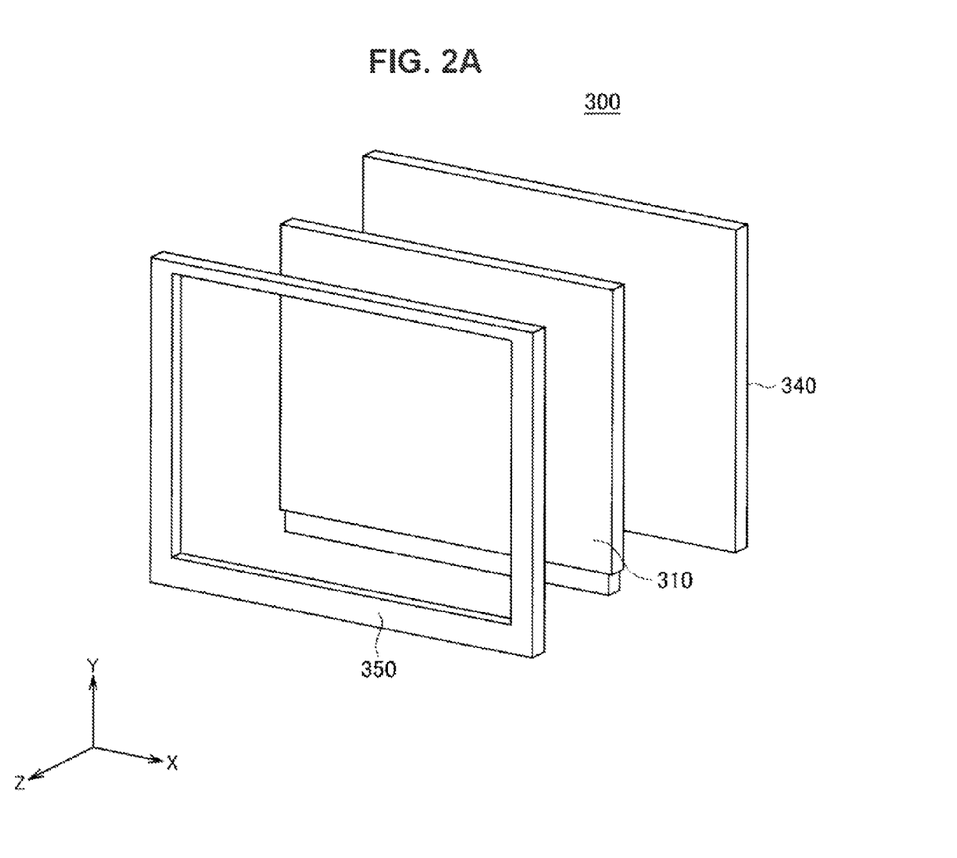
FIG. 2A is a perspective view illustrating an outline configuration of a display side housing according to a first comparison example.
Figure 2B:
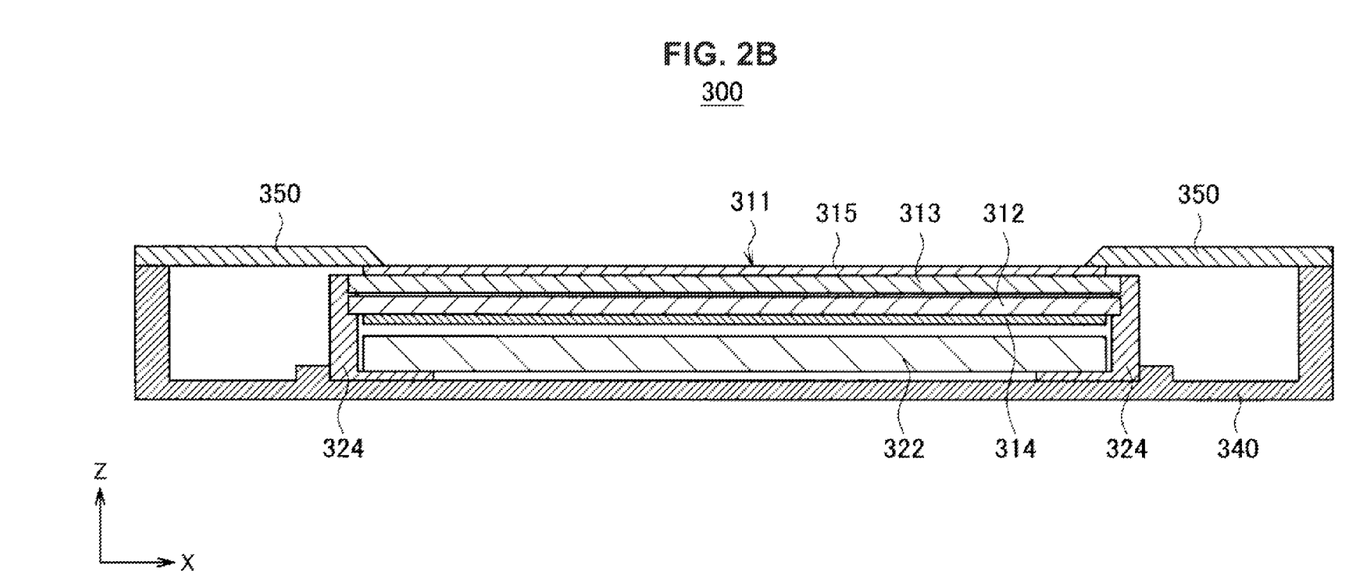
FIG. 2B is a cross-sectional view illustrating an outline configuration of the display side housing according to the first comparison example.

FIG. 2A is a perspective view illustrating an outline configuration of a display side housing 300 according to the first comparison example. FIG. 2B is a cross-sectional view illustrating an outline configuration of the display side housing 300 according to the first comparison example. The display side housing 300 according to the first comparison examples includes a liquid crystal display module 310, a housing 340 and an outer periphery bezel frame 350 as illustrated in FIG. 2A and FIG. 2B.

The liquid crystal display module 310 functions as a display part (liquid crystal display). In order to achieve such function, the liquid crystal display module 310 includes a liquid crystal panel 311, a backlight unit 322 and a frame 324. The liquid crystal panel 311 includes a drive substrate 312, an opposite substrate 313, a drive substrate side polarizing plate 314 and an opposite substrate side polarizing plate 315. A function and the like of each of the liquid crystal panel 311, the backlight unit 322 and the frame 324 will be described in the present embodiment described below.

The housing 340 houses and holds the liquid crystal display module 310. The outer periphery bezel frame 350 covers the outer periphery of the liquid crystal display module 310. The outer periphery bezel frame 350 protrudes from the opposite substrate side polarizing plate 315 of the liquid crystal display module 310 as illustrated in FIG. 2B. Because the outer periphery bezel frame 350 protrudes from the opposite substrate side polarizing plate 315, a difference in level is formed on a front surface of the display side housing 300.

Recently, a flush surface structure (structure having an even and smooth surface) like a single plate has been requested for a surface structure of the display side housing 300. As a technique for responding to such request, a configuration of the display side housing 300 according to the second comparison example described below is proposed.

Figure 3A:
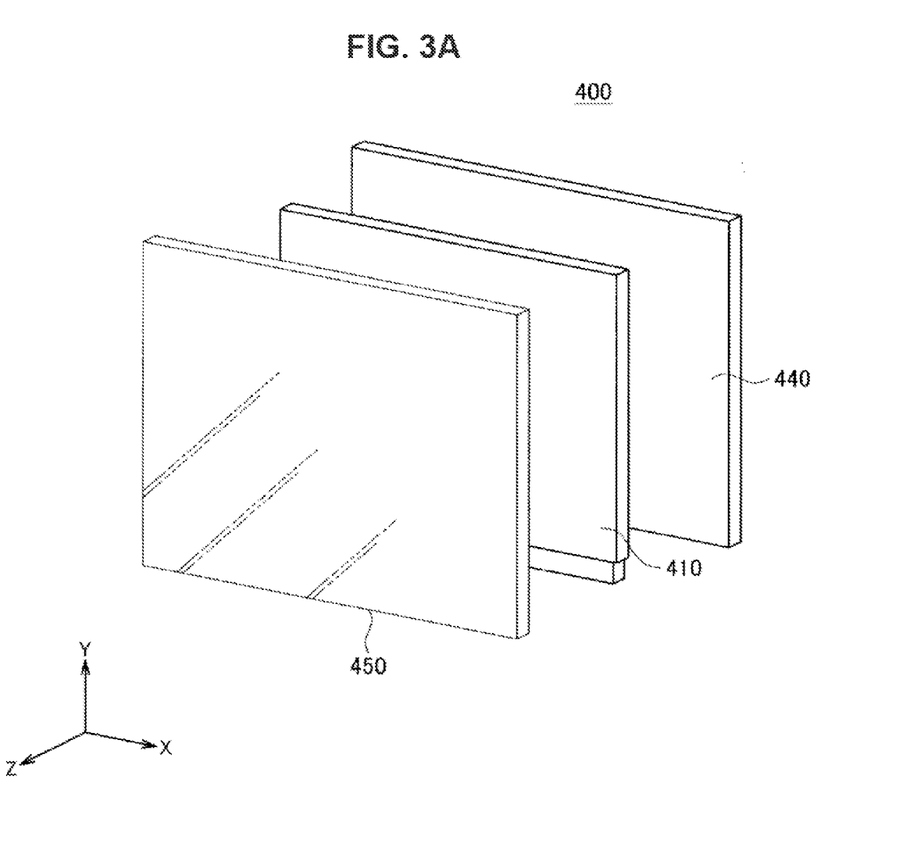
FIG. 3A is a perspective view illustrating an outline configuration of a display side housing according to a second comparison example.
Figure 3B:
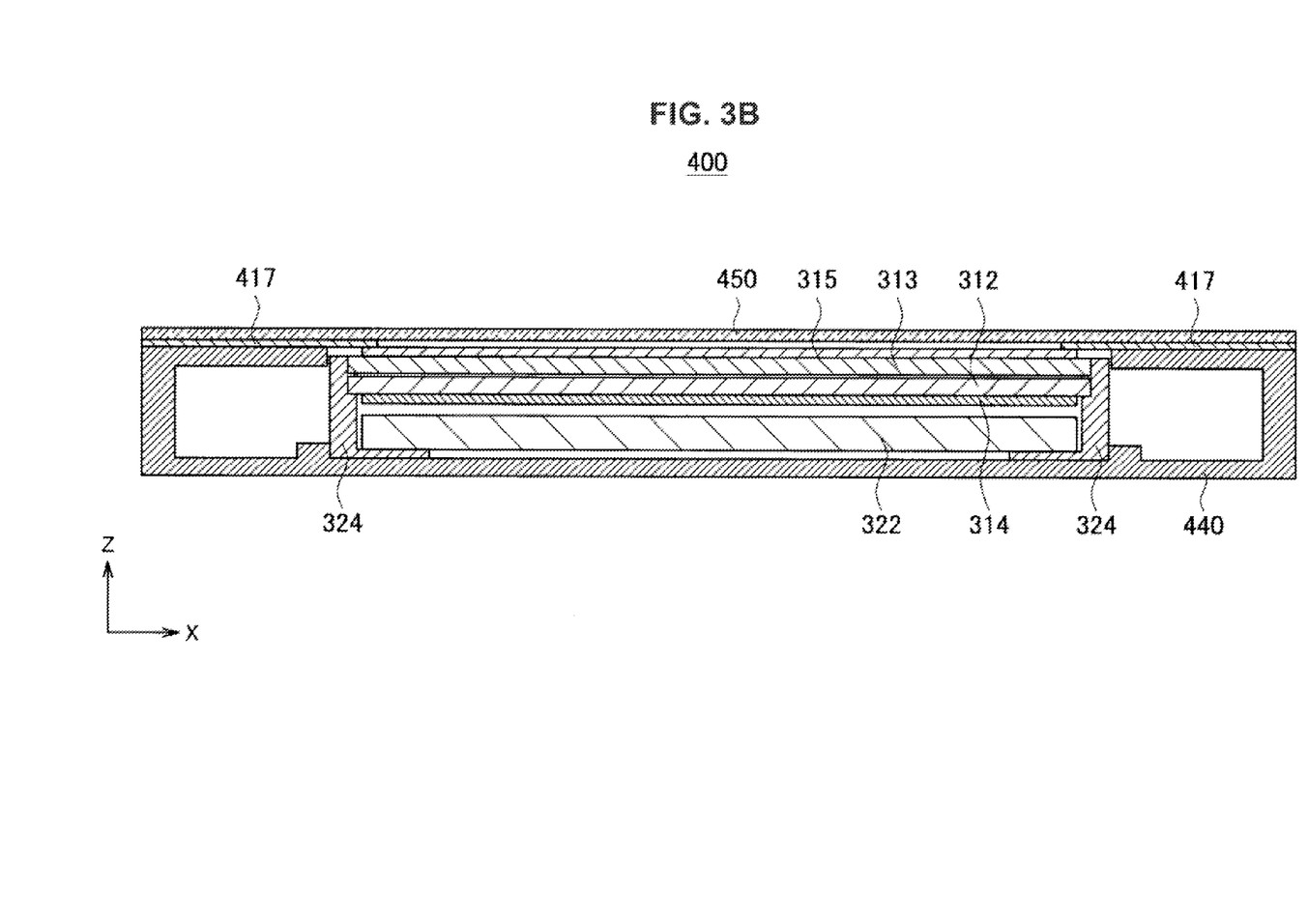
FIG. 3B is a cross-sectional view illustrating an outline configuration of the display side housing according to the second comparison example.

FIG. 3A is a perspective view illustrating an outline configuration of a display side housing 400 according to the second comparison example. FIG. 3B is a cross-sectional view illustrating an outline configuration of the display side housing 400 according to the second comparison example. The display side housing 400 according to the second comparison example includes a liquid crystal display module 410, a housing 440 and a transparent protection layer 450 as illustrated in FIG. 3A and FIG. 3B. That is, the display side housing 400 has the transparent protection layer 450 instead of the outer periphery bezel frame 350 of the first comparison example.

The configurations of the liquid crystal display module 410 and the housing 440 are similar to those of the liquid crystal display module 310 and the housing 340 of the first comparison example.

The transparent protection layer 450 is provided on the liquid crystal display module 410 via an air space. The transparent protection layer 450 has a shape larger than that of the opposite substrate 313 and an outer periphery portion of a rear surface of the transparent protection layer 450 is fixed to the housing 440. The transparent protection layer 450 is a transparent protection plate or film manufactured from a material such as glass, acrylic and polycarbonate having a certain transmittance.

In addition, a light shielding printed layer 417 is formed in a region of the rear surface of the transparent protection layer 450 corresponding to an outer periphery portion of a liquid crystal display area. The light shielding printed layer 417 has a function of hiding an outer periphery portion of the liquid crystal display module 410 and device components and wirings provided on the outer periphery of the liquid crystal display module 410.

In the case where the transparent protection layer 450 is provided via the air space as described above, an interface reflection of the outside light or an interface reflection of the backlighting light sometimes occurs at the interface between the air space and the protection layer or at the interface between the air apace and the liquid crystal display module. An occurrence of such interface reflection leads to deterioration in visibility of liquid crystal display and lower luminance of the liquid crystal display module 410. In order to solve the above-described problem, there are techniques, for example, of applying low-reflectivity coating on a surface of the transparent protection layer 450, or bonding the transparent protection layer 450 with the liquid crystal display module 410 by an optical adhesive resin having a refractive index of about 1.5.

However, in the case of the above-described structure, increases in weight and thickness due to use of the transparent protection layer 450 are inevitable. In addition, it is desirable to bond the transparent protection layer 450 directly with the liquid crystal display module 410 in order to prohibit the deterioration in visibility of the liquid crystal display and the lower luminance of the liquid crystal display module 410. Accordingly, a problem of an increase in an assembly cost and an increase in an infrastructure cost due to an additional manufacturing process arises.

As a result, in order to achieve the flush surface structure without using the transparent protection layer for solving the above-described problem, the electronic device 100 according to the present embodiment includes a polarizing plate extended portion obtained by extending the opposite substrate side polarizing plate and a frame extended portion obtained by extending the frame corresponding to the polarizing plate extended portion as described below in detail.

<3. Display Side Housing Configuration according to Present Embodiment>

A display side housing 120 according to the present embodiment includes a liquid crystal display module 210 as an example of a display module and a housing 240. Note that, the display side housing 120 according to the present embodiment does not include the above-described outer periphery bezel frame 350 according to the first comparison example and the above-described transparent protection layer 450 according to the second comparison example.

In the following description, a configuration of the display side housing 120 will be described in such a manner that a configuration of the liquid crystal display module 210 will be described first, and subsequently, other configurations will be described.

(3-1. Liquid Crystal Display Module Configuration)

Figure 4:
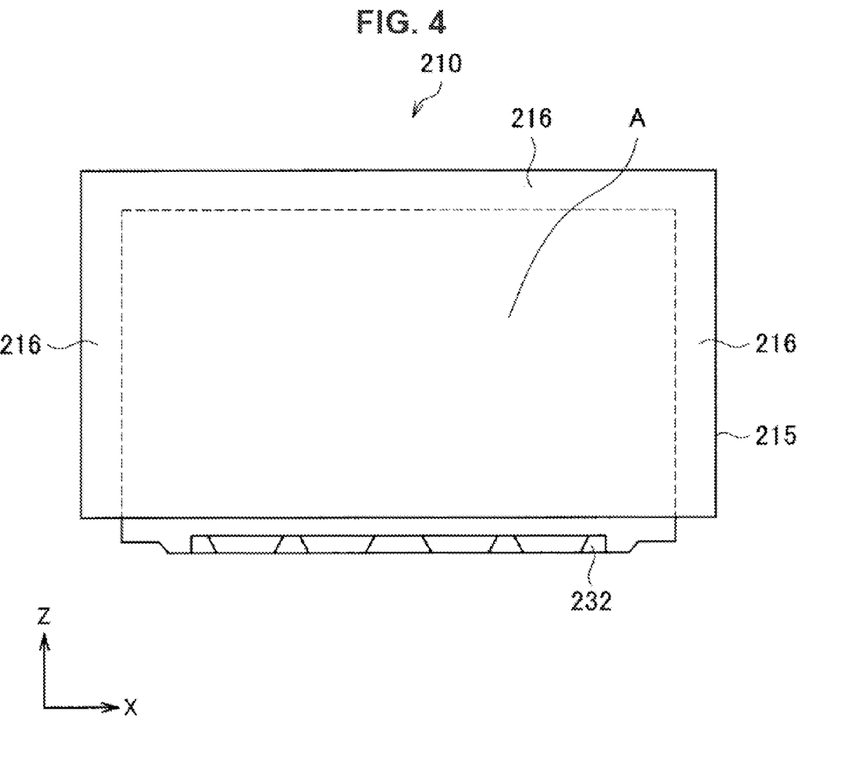
FIG. 4 is a plan view of a liquid crystal display module according to the present embodiment.
Figure 5:
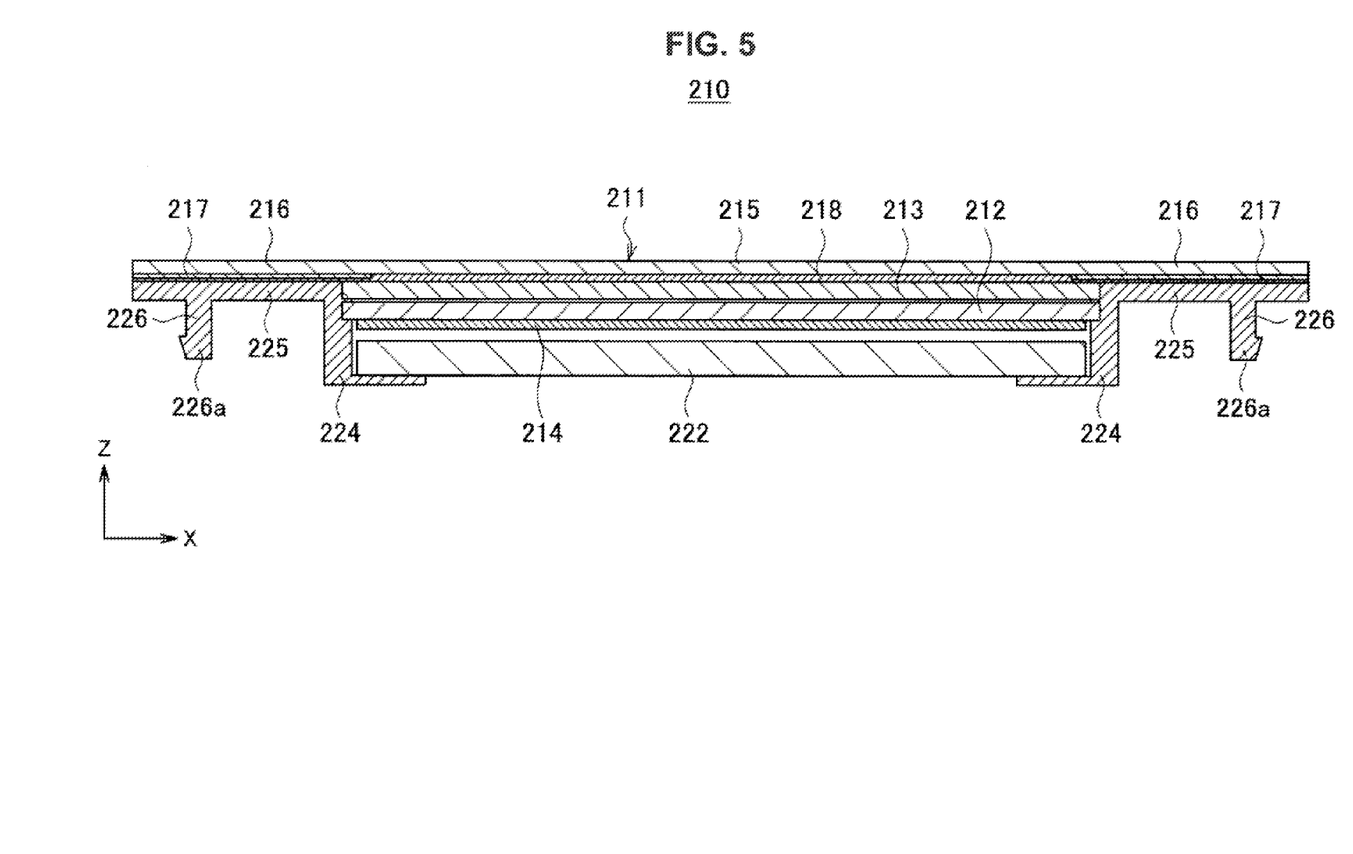
FIG. 5 is a cross-sectional view of the liquid crystal display module.

The configuration of the liquid crystal display module 210 according to the present embodiment will be described with reference to FIG. 4 and FIG. 5. FIG. 4 is a plan view of the liquid crystal display module 210 according to the present embodiment. FIG. 5 is a cross-sectional view of the liquid crystal display module 210.

As illustrated in FIG. 5, the liquid crystal display module 210 includes a liquid crystal panel 211, a backlight unit 222 and a frame 224. The liquid crystal panel 211 includes a drive substrate 212, an opposite substrate 213, a drive substrate side polarizing plate 214 and an opposite substrate side polarizing plate 215.

The drive substrate 212 and the opposite substrate 213 are glass substrates and disposed so as to face each other. Thin film transistors are formed on the drive substrate 212 and color filters are formed on the opposite substrate 213. A liquid crystal material is encapsulated between the drive substrate 212 and the opposite substrate 213. The drive substrate 212 and the opposite substrate 213 constitute a rectangular display panel.

At a lower edge of the drive substrate 212, a FPC (Flexible Printed Circuit)/PWB (Printed Wiring Board) mounting region 232 is provided as illustrated in FIG. 4. The FPC/PWB mounting region 232 connects the PWB on which a drive circuit, a backlight drive circuit and an LVDS (Low Voltage Differential Signaling) interface are mounted. The reason why the FPC/PWB mounting region 232 is provided at the lower edge of the drive substrate 212 is to achieve thinning of the liquid crystal display module 210.

The drive substrate side polarizing plate 214 and the opposite substrate side polarizing plate 215 are provided outside the drive substrate 212 and the opposite substrate 213, respectively and each has a function of transmitting light in only one direction but blocking light in other directions by absorption, reflection, scattering or the like. The drive substrate side polarizing plate 214 is located below the drive substrate 212 to cover the entire surface of the drive substrate 212. The opposite substrate side polarizing plate 215 is located above the opposite substrate 213 to cover the entire surface of the opposite substrate 213.

The drive substrate side polarizing plate 214 has the same size as the display panel (drive substrate 212, opposite substrate 213) but the opposite substrate side polarizing plate 215 has a larger size than the glass substrate. The opposite substrate side polarizing plate 215 has the polarizing plate extended portion 216 extended outward beyond the glass substrate from the side surfaces of the opposite substrate side polarizing plate 215 on three edges other than the lower edge on which the FPC/PWB mounting region 232 is provided. As illustrated in FIG. 4, the polarizing plate extended portion 216 is located on the outer periphery of a display area A of the liquid crystal display module 210. Note that, the polarizing plate extended portion 216 is provided on three edges in the above description, but not limited to this, and the polarizing plate extended portion 216 may be provided on only one edge or two edges, for example, or the polarizing plate extended portion 216 may be provided on the all of the four edges.

The opposite substrate side polarizing plate 215 is laminated such that two sheets of TAC (triacetylcellulose) films sandwich PVA (polyvinyl alcohol). To the surface side TAC, surface treatment such as a hard coating layer, a low reflecting coating layer, an anti-glare layer or the like is applied.

On a rear surface of the opposite substrate side polarizing plate 215, a light shielding printed layer 217 is formed. More particularly, the light shielding printed layer 217 is formed on the rear surfaces of the polarizing plate extended portion 216 and the opposite substrate side polarizing plate 215 at the outer periphery of the display area A of the display panel. The light shielding printed layer 217 is formed by a black ink or the like to hide an outer periphery portion of the liquid crystal display module 210 and device components and wirings provided on the outer periphery of the liquid crystal display module 210.

On the entire rear surface of the opposite substrate side polarizing plate 215 including the light shielding printed layer 217, an adhesion layer 218 as an example of a bonding layer is formed. The adhesion layer 218 has a function of bonding the opposite substrate side polarizing plate 215 and the polarizing plate extended portion 216 to the opposite substrate 213 and the frame 224 (frame extended portion 225). Because of this, deformation or the like of the opposite substrate side polarizing plate 215 and the polarizing plate extended portion 216 can be effectively inhibited. Note that, a phase difference film or a liquid crystal film may be provided between the TAC and the light shielding printed layer 217 or the adhesion layer 218.

The backlight unit 222 irradiates light beams toward the liquid crystal panel 211. The backlight unit 222 includes, for example, an LED chip as a light source, a light guide plate, a prism sheet, a diffusion sheet and a reflection sheet.

The frame 224 supports the backlight unit 222. The frame 224 also supports the display panel (drive substrate 212, opposite substrate 213). Though the frame may be a plastic or metal frame, the frame 224 is assumed to be a plastic frame in the present embodiment. The frame 224 has the frame extended portion 225 extended from the frame 224 along an extending direction of the polarizing plate extended portion 216.

The frame extended portion 225 supports the polarizing plate extended portion 216 to inhibit deformation (reinforce intensity) of the thin polarizing plate extended portion 216. A profile of the frame extended portion 225 has the same size as a profile of the polarizing plate extended portion 216. Note that, the profile of the frame extended portion 225 may have a larger size than the profile of the polarizing plate extended portion 216.

The frame extended portion 225 is bonded to the polarizing plate extended portion 216 by the adhesion layer 218. The surface of the frame extended portion 225 is to be a bonding plane with the polarizing plate extended portion 216, so that the surface is smooth and flat. Because of this, the polarizing plate extended portion 216 is supported by the frame extended portion 225 in stable condition.

There is a difference in level less than or equal to 0.1 mm between a bonding surface of the opposite substrate 213 to which the opposite substrate side polarizing plate 215 is bonded and a supporting surface of the frame extended portion 225 for supporting the polarizing plate extended portion 216. It is more preferred that the bonding surface and the supporting surface lie in the same plane without a difference in level. In this case, the more highly accurate flush surface structure can be achieved without a bend or the like between the opposite substrate side polarizing plate 215 and the polarizing plate extended portion 216.

On the rear surface side of the frame extended portion 225, frame side fixing parts 226 fixing the liquid crystal display module 210 to the housing 240 are formed. The liquid crystal display module 210 is fixed to the housing 240 by engagement of hooks 226a of the frame side fixing parts 226 with housing side fixing parts 242 of the housing 240. Because of this, the liquid crystal display module 210 can be easily assembled with the housing 240 thereby improving assemblability of the display side housing 120.

(3-2. Liquid Crystal Display Module Manufacturing Processes)

An example of manufacturing processes of the liquid crystal display module 210 having the above-described configuration will be described. First, the drive substrate 212 and the opposite substrate 213 are prepared and the display panel is formed by encapsulation of the liquid crystal material between the drive substrate 212 and the opposite substrate 213. Subsequently, the drive substrate side polarizing plate 214 is bonded to the drive substrate 212.

Subsequently, the display panel is fixed to the frame 224 together with the backlight unit 222. At this time, it is preferred that the utmost surface of the opposite substrate 213 and the utmost surface of the frame extended portion 225 are flat without any difference in level therebetween. Finally, the opposite substrate side polarizing plate 215 on which the light shielding printed layer 217 is formed at the outer periphery and the polarizing plate extended portion 216 are bonded onto the opposite substrate 213 and the frame extended portion 225.

As a result of the above manufacturing processes, the utmost surface becomes even and the liquid crystal display module 210 like a single plate can be obtained.

(3-3. Housing & Surround Configurations)

Figure 6:
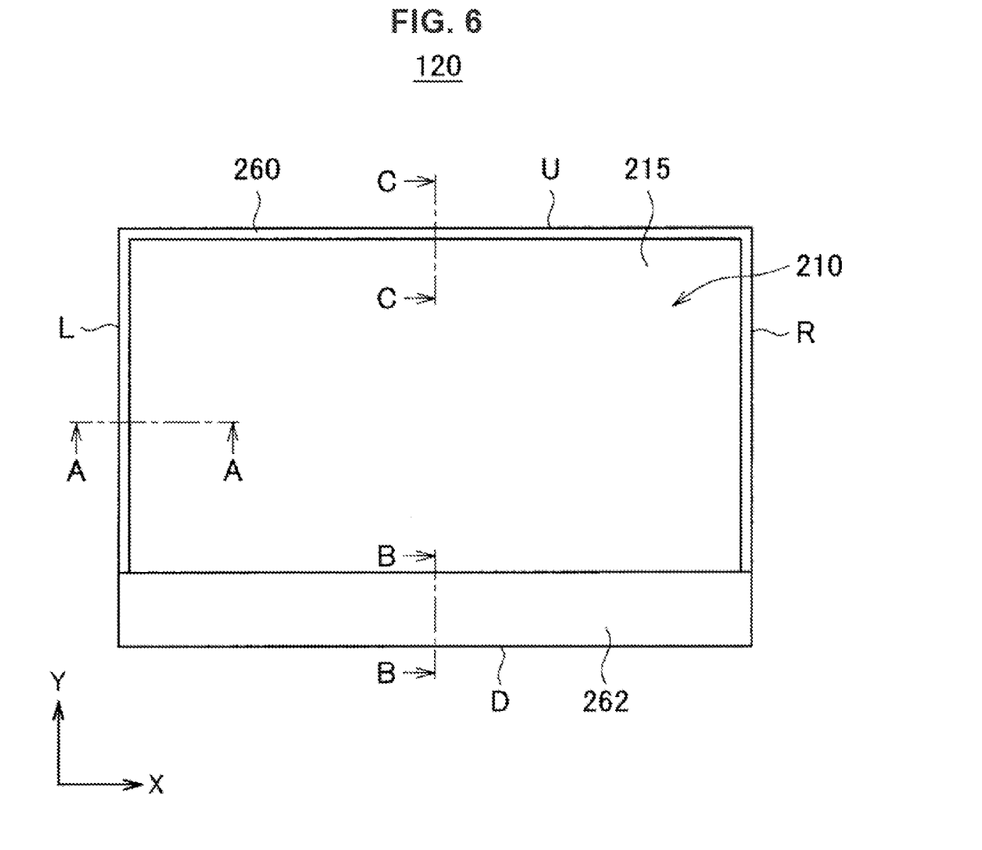
FIG. 6 is a plan view of a display side housing in a state where the liquid crystal display module is fixed to the housing.
Figure 7:
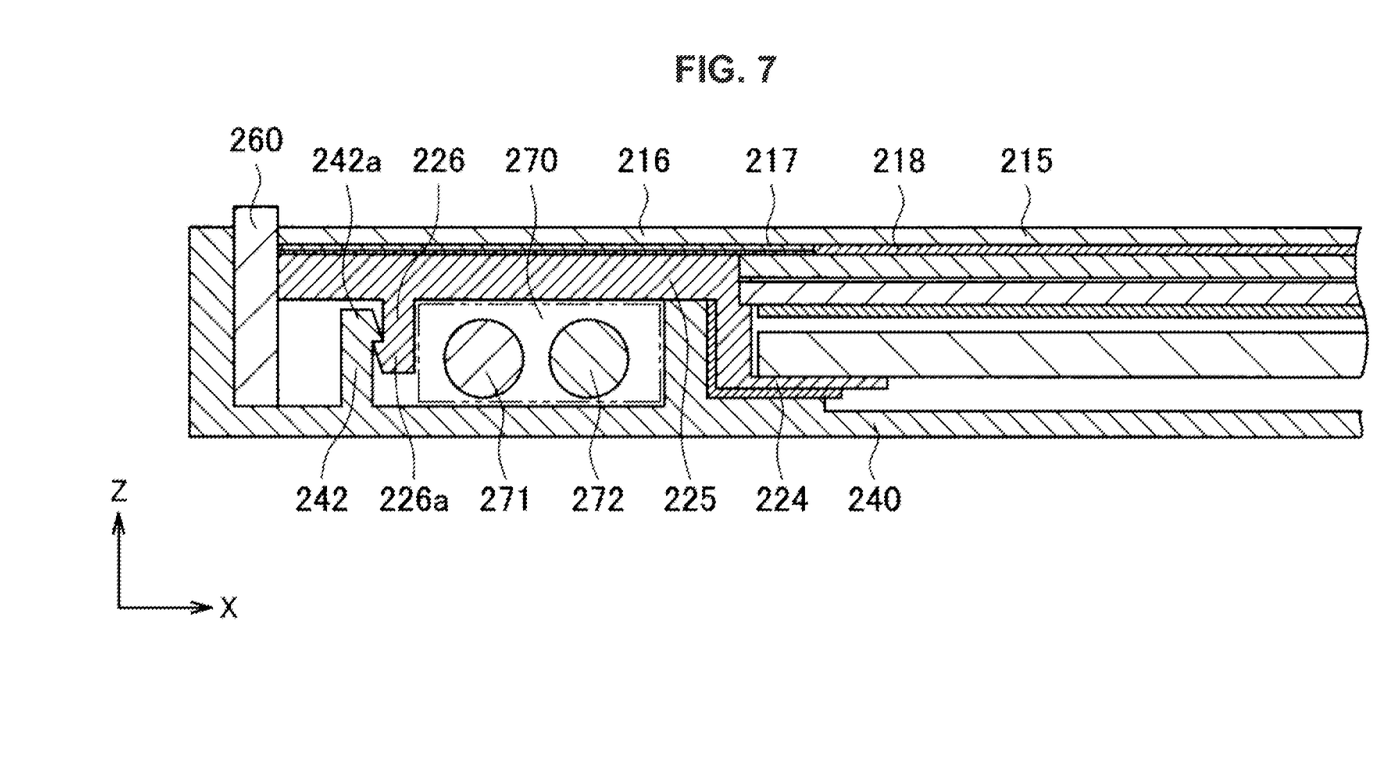
FIG. 7 is a cross-sectional view along the line A-A in FIG. 6.
Figure 8:
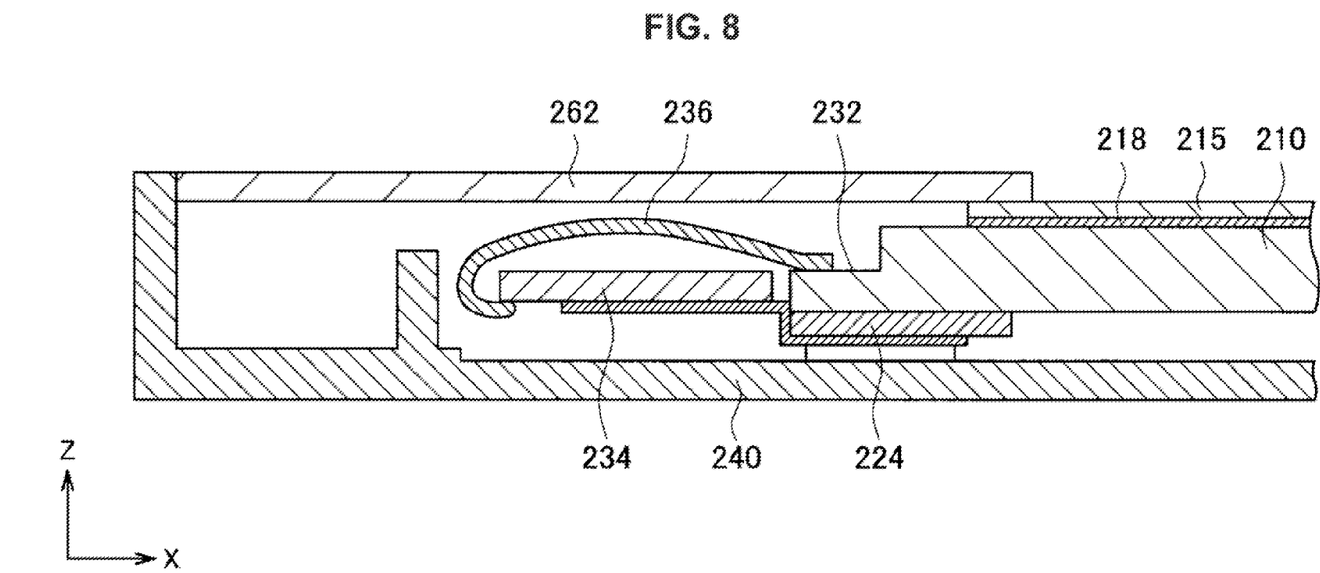
FIG. 8 is a cross-sectional view along the line B-B in FIG. 6.
Figure 9:
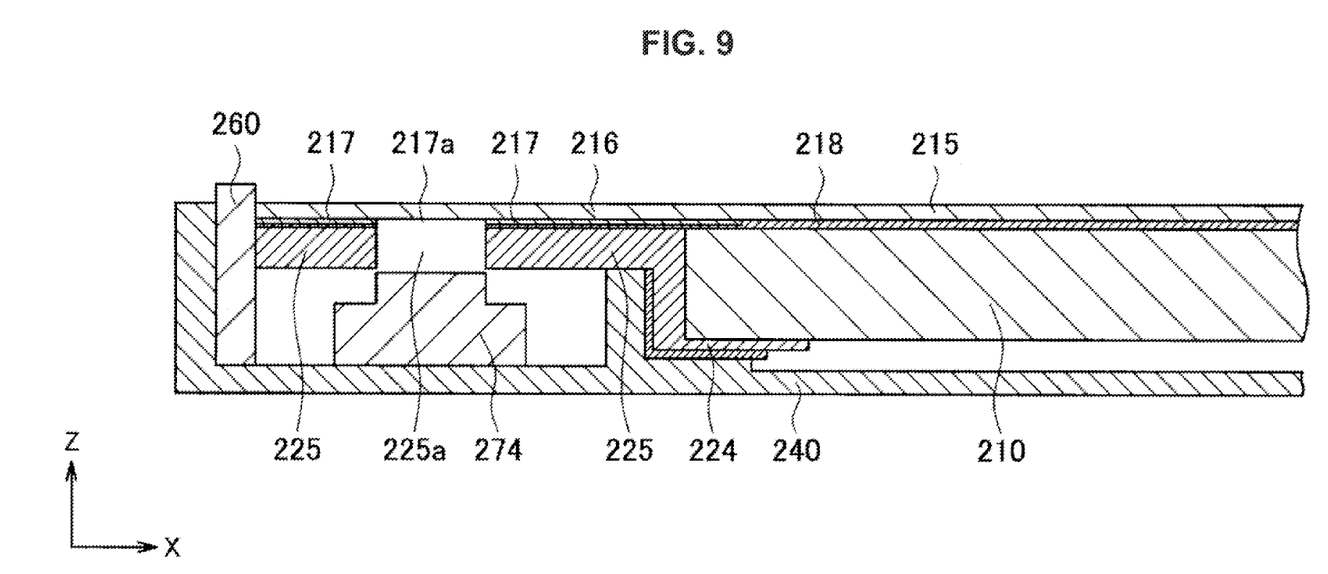
FIG. 9 is a cross-sectional view along the line C-C in FIG. 6.

The configurations of the housing 240 and the surround will be described with reference to FIG. 6 through FIG. 8. FIG. 6 is a plan view of the display side housing 120 in a state where the liquid crystal display module 210 is fixed to the housing 240. FIG. 7 is a cross-sectional view along the line A-A in FIG. 6. FIG. 8 is a cross-sectional view along the line B-B in FIG. 6. FIG. 9 is a cross-sectional view along the line C-C in FIG. 6.

The housing 240 is provided with the housing side fixing part 242 fixing the liquid crystal display module 210 as illustrated in FIG. 7. The liquid crystal display module 210 and the housing 240 are fixed by engagement of a hook 242a of the housing side fixing part 242 with the hook 226a of the frame side fixing part 226 of the liquid crystal display module 210.

In the state where the liquid crystal display module 210 is fixed to the housing 240, the wirings and the device components are provided between the frame extended portion 225 having a thickness smaller than a thickness of the liquid crystal display module 210 and the housing 240. For example, between the frame extended portion 225 and the housing 240 on the side of a left edge L (FIG. 6) of the display side housing 120, a wiring space 270 is secured as illustrated in FIG. 7. In the wiring space 270, an antenna wiring 271 and a camera wiring 272 are arranged, for example.

Further, between the frame extended portion 225 and the housing 240 on the side of an upper edge U (FIG. 6) of the display side housing 120, a camera module 274 as an example of the imaging member is provided as illustrated in FIG. 9. The camera module 274 has an imaging element for taking a picture of a subject, and the like. By providing the wiring space 270 and the camera module 274 as described above, the electronic components and the like can be arranged even when the display side housing 120 is thinned.

At a portion of the frame extended portion 225 where an optical axis of the camera module 274 passes, a through hole 225a is provided such as not to disturb image taking by the camera module 247 provided on the rear surface side of the frame extended portion 225. For the same reason, the light shielding printed layer 217 having the function of hiding the camera module 274, wirings relevant to the camera module 274 and the like is formed (on a portion where the optical axis does not pass) so as to exclude a portion 217a corresponding to the through hole 225a of the rear surface of the polarizing plate extended portion 216.

Figure 10:
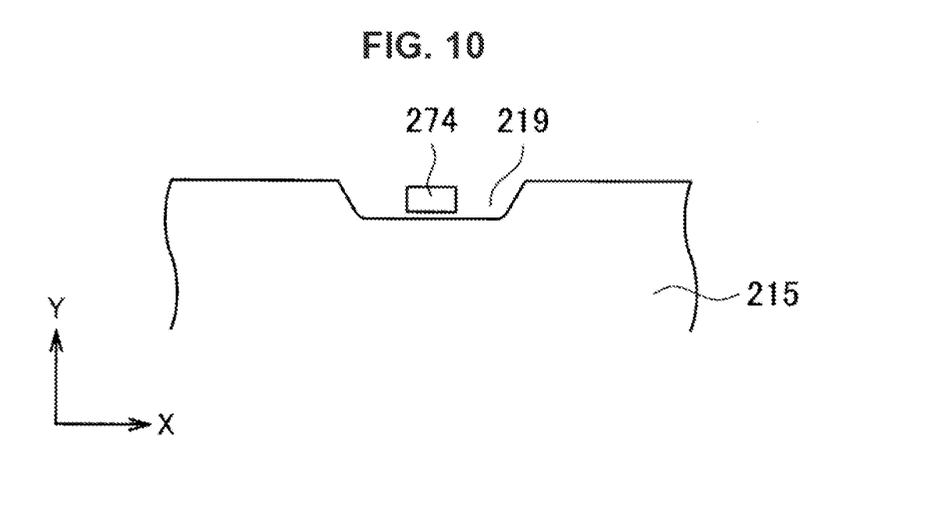
FIG. 10 is a diagram explanatory of a notch provided on the opposite substrate side polarizing plate.

Alternatively, a hole (not shown) may be provided at the portion corresponding to the through hole 225a of the polarizing plate extended portion 216. In the case where the hole is provided on the polarizing plate extended portion 216, it is preferred to caulk the hole with an acrylic material. Alternatively, a notch 219 as illustrated in FIG. 10 may be provided instead of the hole. Practically, the notch 219 is also caulked by the acrylic material. FIG. 10 is a diagram explanatory of the notch 219 provided on the opposite substrate side polarizing plate 215.

On the side of a lower edge D (FIG. 6) of the display side housing 120 where the polarizing plate extended portion 216 and the frame extended portion 225 are not provided, a lower edge bezel 262 is attached. As illustrated in FIG. 8, the FPC/PWB mounting region 232 is provided between the lower edge bezel 262 and the housing 240. In the FPC/PWB mounting region 232, the PWB 234 is connected with the drive substrate 212 via the FPC 236. Note that, in the case where the polarizing plate extended portion 216 and the frame extended portion 225 are provided on the side of the lower edge D of the display side housing 120, the lower edge bezel 262 is unnecessary.

Alternatively, a rubber cushion 260 as a cushioning material is attached to the outer periphery of the frame extended portion 225 on the utmost outer periphery of the liquid crystal display module 210 as illustrated in FIG. 6, FIG. 7 and FIG. 9. In the drawings, though the rubber cushion 260 is illustrated as to protrude from the frame extended portion 225, but not limited to this, and the rubber cushion 260 may not protrude from the frame extended portion 225.

In the present embodiment, the opposite substrate side polarizing plate 215 and the polarizing plate extended portion 216 form the utmost surface of the display side housing 120. This is unlike the first comparison example where the outer periphery bezel frame 350 forms the utmost surface of the display side housing 300 or unlike the second comparison example where the transparent protection layer 450 forms the utmost surface of the display side housing 400.

<4. Conclusion>

As described above, the opposite substrate side polarizing plate 215 of the electronic device 100 has the polarizing plate extended portion 216 extended from at least one side surface of the opposite substrate side polarizing plate 215 outward beyond the opposite substrate 213. Further, the frame 224 has the frame extended portion 225 extended from the frame 224 along the extending direction of the polarizing plate extended portion 216 to support the polarizing plate extended portion 216.

According to the above-described configuration, the opposite substrate side polarizing plate 215 and the polarizing plate extended portion 216 can form the utmost surface of the display side housing 120 by a single plate. Further, the frame extended portion 225 supports the polarizing plate extended portion 216 thereby inhibiting deformation and the like of the polarizing plate extended portion 216. Still further, the polarizing plate extended portion 216 does not deteriorate the display function. As a result, according to the present embodiment, the optimum flush surface structure can be achieved without deterioration in the display function.

In addition, according to the present embodiment, the thinner and more lightweight flush surface structure can be achieved in comparison with the first comparison example and the second comparison example because the outer periphery bezel frame 350 in the first comparison example and the transparent protection layer 450 in the second comparison example become unnecessary. Further, deterioration in the display function such as lower visibility of the liquid crystal display and lower luminance of the liquid crystal display module caused by the transparent protection layer 450 can be inhibited. In addition, the increase in the assembly cost and the increase in the infrastructure cost due to the additional manufacturing process are inhibited by not using the outer periphery bezel frame 350 and the transparent protection layer 450.

Still further, according to the present embodiment, an appearance close to an unlit state and a light blocking effect of the display area of the liquid crystal display module 210 can be ensured by providing the light shielding printed layer 217 on the rear surface side of the polarizing plate extended portion 216. Still further, it becomes easy to assemble the liquid crystal display module 210 with the housing 240 and it becomes easy to rework the structure by providing the frame side fixing parts 226. Still further, the notebook computer can be thinned because the space for housing the wirings of the surrounding members such as the antenna wiring is provided on the rear surface of the frame extended portion 225 of the backlight unit.

Though, the preferred embodiment of the present disclosure is described in detail with reference to the appended drawings as above, the technical scope of the present disclosure is not limited to the above-described embodiment. It should be understood by those skilled in the art that various modifications, combinations, sub-combinations and alterations may occur depending on design requirements and other factors insofar as they are within the scope of the appended claims or the equivalents thereof, and those modifications, combinations, sub-combinations and alterations may be obviously included in the technical scope of the present disclosure.

In the above description, the display module includes the liquid crystal display module (liquid crystal display), but not limited to this. The display module may include an organic EL display, for example as long as having the display panel and the polarizing plate.

Additionally, the following configurations are also within the technical scope of the present disclosure.

(1) An information processing apparatus including:
a rectangular display panel;
a polarizing plate covering an entire surface of the display panel; and
a frame supporting the display panel,
wherein the polarizing plate includes a polarizing plate extended portion extended from at least one side surface of the polarizing plate outward beyond the display panel, and
the frame includes a frame extended portion extended from the frame along an extending direction of the polarizing plate extended portion to support the polarizing plate extended portion.

(2) The information processing apparatus according to (1), wherein a light shielding printed layer is formed on a rear surface of the polarizing plate extended portion.

(3) The information processing apparatus according to (2), wherein
the display panel includes a predetermined display area, and
the light shielding printed layer is formed on the rear surface of the polarizing plate extended portion and a rear surface of the polarizing plate at an outer periphery of the display area of the display panel.

(4) The information processing apparatus according to any one of (1) to (3), wherein the polarizing plate extended portion is bonded to the frame extended portion.

(5) The information processing apparatus according to any one of (1) to (4), wherein
the polarizing plate is bonded to the display panel, and
a difference in level between a surface of the display panel to which the polarizing plate is bonded and a surface of the frame extended portion for supporting the polarizing plate extended portion is less than or equal to 0.1 mm.

(6) The information processing apparatus according to (5), wherein the polarizing plate and the polarizing plate extended portion are bonded to the display panel and the frame extended portion by a bonding layer.

(7) The information processing apparatus according to any one of (1) to (6), further including:
a display module including the display panel, the polarizing plate and the frame, and
a housing to which the display module is fixed,
wherein a fixing part fixing the display module to the housing by engagement with the housing is formed on a rear surface side of the frame extended portion.

(8) The information processing apparatus according to (7), wherein a thickness of the frame extended portion is smaller than a thickness of the display module.

(9) The information processing apparatus according to any one of (1) to (8), further including:
an imaging member for taking a picture on the rear surface side of the frame extended portion,
wherein the frame extended portion has a through hole at a portion where an optical axis passes at a time when a picture is taken by the imaging member.

(10) The information processing apparatus according to (9), wherein the light shielding printed layer is formed on the rear surface of the polarizing plate extended portion at a portion where the optical axis does not pass.

(11) The information processing apparatus according to any one of (1) to (10), wherein
the display panel includes
a drive substrate and an opposite substrate facing the drive substrate, and
a liquid crystal material is encapsulated between the drive substrate and the opposite substrate.

What is claimed is:

1. An information processing apparatus comprising:
a rectangular display panel;
a polarizing plate covering an entire surface of the display panel; and
a frame supporting the display panel,
wherein the polarizing plate includes a polarizing plate extended portion extended from one side surface of the polarizing plate outward beyond the display panel,
the frame includes a frame extended portion extended from the frame along an extending direction of the polarizing plate extended portion to support the polarizing plate extended portion, and
a profile of the frame extended portion has a same size as a profile of the polarizing plate extended portion such that an outer edge of the frame extended portion is align with a corresponding outer edge of the polarizing plate extended portion.

2. The information processing apparatus according to claim 1, wherein a light shielding printed layer is formed on a rear surface of the polarizing plate extended portion.

3. The information processing apparatus according to claim 2, wherein the display panel includes a predetermined display area, and the light shielding printed layer is formed on the rear surface of the polarizing plate extended portion and a rear surface of the polarizing plate at an outer periphery of the display area of the display panel.

4. The information processing apparatus according to claim 1, wherein the polarizing plate extended portion is bonded to the frame extended portion.

5. The information processing apparatus according to claim 1, wherein the polarizing plate is bonded to the display panel, and a difference in level between a surface of the display panel to which the polarizing plate is bonded and a surface of the frame extended portion for supporting the polarizing plate extended portion is less than or equal to 0.1 mm.

6. The information processing apparatus according to claim 5, wherein the polarizing plate and the polarizing plate extended portion are bonded to the display panel and the frame extended portion by a bonding layer.

7. The information processing apparatus according to claim 1, further comprising:

a display module including the display panel, the polarizing plate and the frame, and a housing to which the display module is fixed, wherein a fixing part fixing the display module to the housing by engagement with the housing is formed on a rear surface side of the frame extended portion.

8. The information processing apparatus according to claim 7, wherein a thickness of the frame extended portion is smaller than a thickness of the display module.

9. An information processing apparatus comprising:

a rectangular display panel;

a polarizing plate covering an entire surface of the display panel; and a frame supporting the display panel, wherein the polarizing plate includes a polarizing plate extended portion extended from at least one side surface of the polarizing plate outward beyond the display panel, and the frame includes a frame extended portion extended from the frame along an extending direction of the polarizing plate extended portion to support the polarizing plate extended portion, and the information processing apparatus further comprising:

an imaging member for taking a picture on the rear surface side of the frame extended portion, wherein the frame extended portion has a through hole at a portion where an optical axis passes at a time when a picture is taken by the imaging member.

10. The information processing apparatus according to claim 9, wherein the light shielding printed layer is formed on the rear surface of the polarizing plate extended portion at a portion where the optical axis does not pass.

11. The information processing apparatus according to claim 1, wherein the display panel includes a drive substrate and an opposite substrate facing the drive substrate, and a liquid crystal material is encapsulated between the drive substrate and the opposite substrate.

12. The information processing apparatus according to claim 1, wherein the polarizing plate extended portion extends from two side surfaces of the polarizing plate outward beyond the display panel.

13. The information processing apparatus according to claim 1, wherein the polarizing plate extended portion extends from three side surfaces of the polarizing plate outward beyond the display panel.

14. The information processing apparatus according to claim 1, wherein the polarizing plate extended portion extends from four side surfaces of the polarizing plate outward beyond the display panel.

* * * * *